Sept. 20, 1949.  J. J. JONES  2,482,621
PHOTOFINISH CAMERA AND RECORDING SYSTEM
Filed Dec. 15, 1947  4 Sheets-Sheet 1

Inventor
James J. Jones
By Strauch & Hoffman
Attorneys

Sept. 20, 1949.    J. J. JONES    2,482,621
PHOTOFINISH CAMERA AND RECORDING SYSTEM
Filed Dec. 15, 1947    4 Sheets-Sheet 2

Inventor
James J. Jones
By Strauch & Hoffman
Attorneys

Sept. 20, 1949.  J. J. JONES  2,482,621
PHOTOFINISH CAMERA AND RECORDING SYSTEM
Filed Dec. 15, 1947  4 Sheets-Sheet 3

Inventor
James J. Jones
By Strauch & Hoffman
Attorneys

Sept. 20, 1949.  J. J. JONES  2,482,621
PHOTOFINISH CAMERA AND RECORDING SYSTEM
Filed Dec. 15, 1947  4 Sheets-Sheet 4
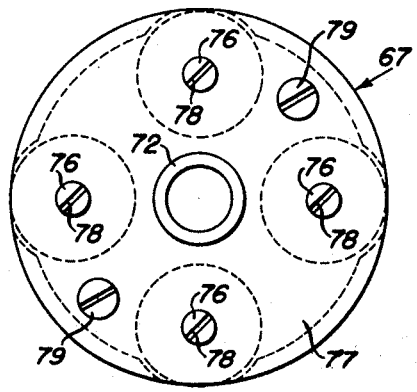
Fig. 8
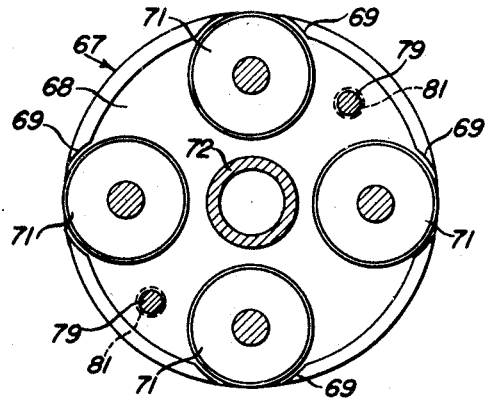
Fig. 9
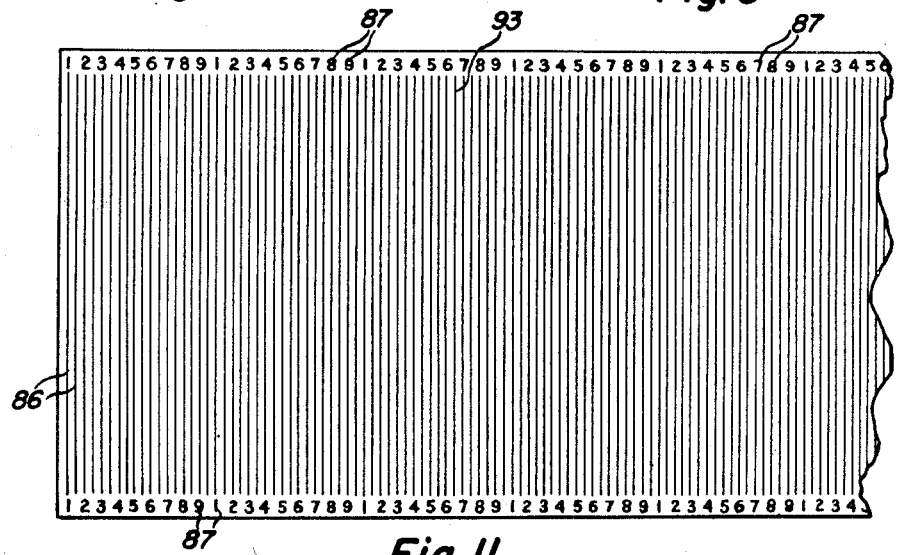
Fig. 11
Fig. 12
Fig. 13
Fig. 14
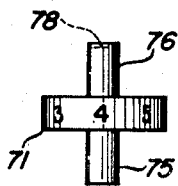
Fig. 10
Inventor
James J. Jones
By Strauch & Hoffman
Attorneys

UNITED STATES PATENT OFFICE 2,482,621

PHOTOFINISH CAMERA AND RECORDING SYSTEM

James J. Jones, Hialeah, Fla.

Application December 15, 1947, Serial No. 791,847

16 Claims. (Cl. 346—107)

The present invention relates to cameras for recording the relative positions of contestants as they cross the finish line of a race course and a method of proving the finish line on the resulting photograph. More particularly the present invention relates to continuous flow, strip film cameras and means for accurately recording informational data and aligned reference marks along the longitudinal edges of the film on opposite sides of the photographed image.

While cameras of the type mentioned have previously been proposed for producing a photofinish of a race, see United States Patents 2,257,100 to H. D. Belock and 2,320,350 to L. Del Riccio, the finish line, which is superimposed on the resulting photograph, cannot be accurately positioned under the prior art methods and with the prior art apparatus. As a consequence, much litigation has arisen in which the promoters of the contests have been successfully sued because of improperly positioned finish lines which show the wrong contestant as the winner. The present invention eliminates the possibility of success in such suits by providing accurately positioned reference marks along the opposite edges of the film to serve as positive guides in applying the superimposed finish line and photographically proving the relative positioning of such marks and the actual finish line of the race course.

It, accordingly, is a primary object of this invention to provide a continuous flow, strip film camera with means for accurately applying reference markings along the opposite longitudinal edges of the film and proving the accuracy of a superimposed finish line applied with reference to said markings against the actual finish line of the race course.

A further important object of the present invention resides in a novel method of applying a superimposed finish line to a photograph of the finish of a race and proving the accuracy of said superimposed finish line with respect to the actual finish line of the race course.

Still another object of the present invention resides in applying transversely aligned markings to a photographic film to assure accurate superimposition of markings to the intermediate portion of the film so as to locate predetermined points on said portion in alignment with opposed edge markings.

Another object of this invention resides in providing a continuous flow, strip film camera with means for applying reference markings to the opposite longitudinal edges of the film as the film is fed through the camera to photograph the finish of a race.

A further object of this invention resides in the provision of a novel indicia bearing driven member having equally angularly spaced markings, timing indicia and other record data arranged thereon so as to be reproduced on a photographic film in predetermined relation to the photographic image.

This invention also contemplates an indicia bearing driven member of the character just mentioned wherein certain of the record data is carried by movable elements which may be quickly and readily moved to alter the displayed data.

A still further object of the present invention resides in providing a continuous flow, strip film camera having a main objective lens with means for selectively taking still photographs of stationary objects within the normal field of view of said lens.

Still another object of the present invention resides in the provision of a photographic exposure of the finish of a race having a pictorial image of the contestants disposed between transversely aligned reference markings and a photographic image of the actual finish line disposed between the aligned reference marks in longitudinal spaced relation to said pictorial image so as to prove the parallelism of the opposed reference marks and the actual finish line.

Other objects will appear from the following description and appended claims when read in conjunction with the attached drawings wherein:

Figure 8 is a top plan view of the indicia bearing driven member of Figure 1;

Figure 9 is a transverse sectional view through the driven member of Figure 8 taken substantially on line 9—9 of Figure 1;

Figure 1:
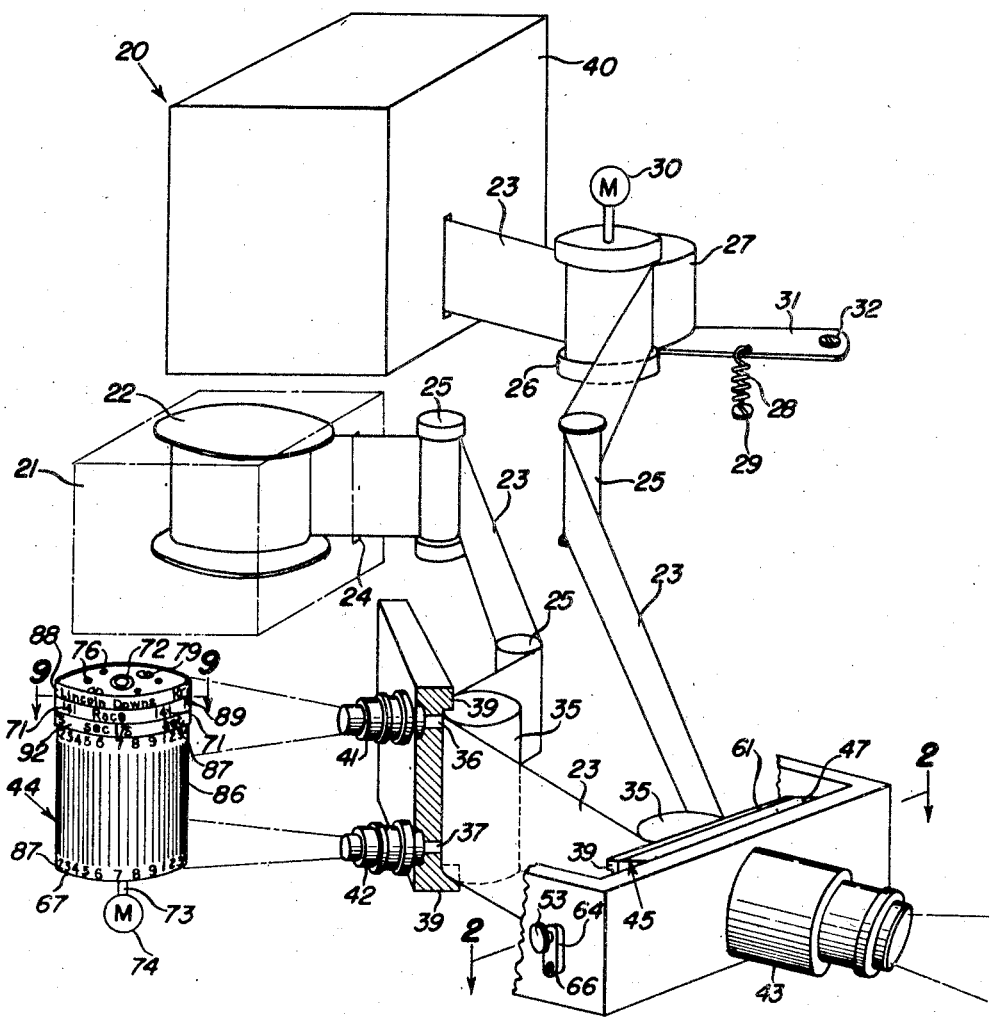
Figure 1 is a schematic view of a continuous flow, strip film camera embodying the present invention.

Figure 10 is a detailed view of the rotatable elements used in the driven member of Figures 8 and 9 to provide the quickly changeable record data on the driven member; and Figures 11 through 14 are developed views of the indicia bearing strips provided for removable attachment to the driven member to respectively provide the reference markings, a record as to the race course and date of the race, the number of the race and the approximate time intervals between the various contestants as they finish the race.

With continued reference to the drawings wherein like parts are designated throughout by the same reference numerals, numeral 20 indicates generally a photographic camera of the continuous flow, strip film type substantially of the type disclosed in Belock Patent 2,257,100. As diagrammatically indicated in Figure 1 camera 20 includes a film magazine 21 constructed in conventional manner to prevent passage of light from the outside of the magazine to the interior and adapted to receive a rotatable film spool 22 containing a continuous strip of film 23. Magazine 21 is also provided in conventional manner with a lighttight opening 24 through which the film 23 passes in operation of the camera.

Camera 20 is also provided with suitably disposed idler rollers 25 for guiding the film 23 in its passage through the camera and a pair of drive rollers 26 and 27 held in pressure contact with the film by tension spring 28 connected at one end as indicated at 29 to a stationary part of the camera and at the other end to a roller carrying lever 31 pivoted at 32 to a stationary part of the camera and adapted to rotatably support roller 27 at its free end. Drive roller 26 as indicated at 30 is drivingly connected to a source of motive power such as a constant speed electric motor so that film 23 is continuously moved at predetermined speed.

Between magazine 21 and drive rollers 26 and 27 film 23 passes a pair of axially aligned exposure slits 36 and 37 and a third exposure slit 38 longitudinally spaced along the path of movement of said film. A pressure roller 35 is provided for pressing the film against said pair of aligned slits 36 and 37 and a second pressure roller 35 is provided to press said film against slit 38. The camera wall at the opposite ends of said pressure rollers is provided with inwardly extending flanges 39 which hold the film against transverse movement during its passage across the exposure slits to assure proper presentation of the film during the exposure. From drive rollers 26 and 27, film 23 passes into a rewind cabinet 40 in well known manner.

Photographic lenses or objectives of conventional construction indicated generally by numerals 41, 42 and 43 are provided adjacent slits 36, 37 and 38 respectively to form images on the upper edge, lower edge and the center respectively of the film strip 23. Objectives 41 and 42 are respectively designed to form an image of the upper edge and lower edge of an indicia bearing drum 44 while objective 43 is adapted to form an image of the contestants as they pass the finish line of the race course. The image produced by each of these objectives is limited by its respective exposure slit so that very small transverse bands of the images are successively formed on film 23. Consequently the effective image produced by each objective is confined to a relatively narrow band of substantially uniform width relative to the respective optical axes of the objectives.

To assure substantial uniformity of width of the field of view, particularly of lens 43 through which the contestants on the race course are photographed, a lens of suitable focal length for the particular setting of the camera is preferably chosen. A particularly effective arrangement is provided where lenses 41 and 42 have a focal length of 3½ inches and lens 43 has a focal length of 6 inches. Since the camera is usually set up at a distance of about 150 feet from the near side of a 90 foot race course and as slit 38 is .012 inch in width, it will be appreciated that the field of view will have a width of 3.64 inches at the near side and 5.60 inches at the far side. The angle of each side line of the view of lens 43 with respect to the optical axis is roughly 0° 4'. As the accuracy of the edges of the slits themselves cannot be held in normal practice to assure a lesser angle of departure and as superposing of the finish line by eyesight would embody far greater error, this angular variation between the edges of the view and the optical axis may be disregarded as a practical matter and the slits can be centered with respect to the optical axis. An examination of the photographic record shows no detectable distortions due to camera position and angle when set up as hereinafter described.

Figure 2:
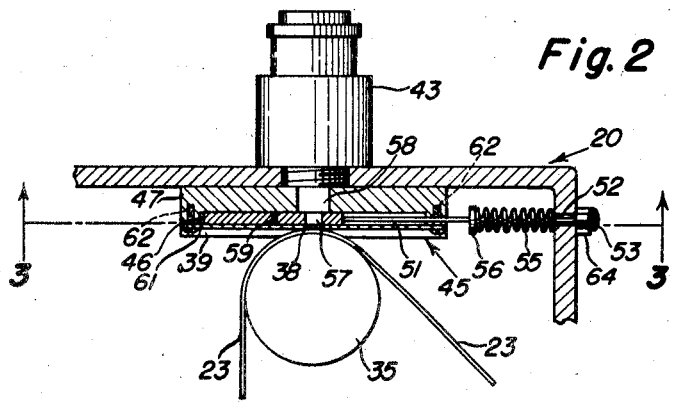
Figure 2 is a horizontal sectional view taken substantially on the line 2—2 of Figure 1 and illustrating the details of the focal plane shutter provided for selectively making still photographs through the main objective lens of the camera of Figure 1.
Figure 3:
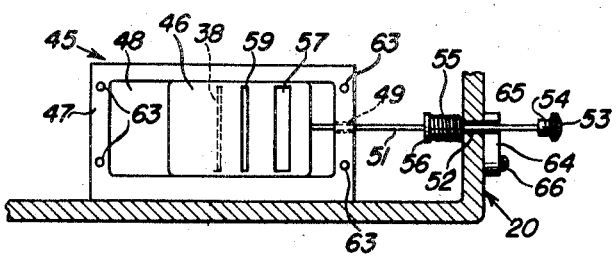
Figures 3 and 4 are sectional views taken substantially on line 3—3 of Figure 2 and respectively illustrating the position of the movable shutter before and after exposing the film to make a still picture.

Camera 20 is also provided with a focal plane shutter 45 which is interposed between lens 43 and its exposure slit 38 to adapt the camera for taking snapshots of the actual finish line of the race course. While shutter 45 may assume any suitable form, the present invention contemplates a shutter plate 46 (Figures 2 to 4) slidably mounted for axial movement transversely of lens 43 in a frame 47 suitably secured to the inner face of the camera wall. Frame 47 is provided with an elongated open sided recess 48 in its face opposite the camera wall to receive plate 46. As clearly seen in Figures 3 and 4 recess 48 is substantially longer than plate 46 but is of a width to snugly and slidably receive the axial edges of the plate. One end of frame 47, preferably along the axial centerline of recess 48, is provided with a through opening 49 adapted to slidably receive a shutter operating rod 51 rigidly secured at one end to shutter plate 46. The other end of rod 51 extends axially beyond opening 49 and through a suitable lighttight opening 52 in the camera wall and is provided with a knurled operating knob 53. Knob 53 is preferably threaded on rod 51 and has an axially elongated hub 54 to permit slight relative axial adjustment of the free end of hub 54 with respect to rod 51 for a purpose to be presently pointed out. Any suitable means (not shown) for securing knob 53 in its adjusted position may be provided.

A compression spring 55 surrounds the portion of rod 51 between the wall of camera 20 and the adjacent end of frame 47. One end of spring 55 abuts the inner face of the camera wall and its opposite end abuts a plate or the like 56 suitably secured to rod 51. As a consequence, rod 51 with its associated shutter plate 46 and operating knob 53 is normally urged toward one end of recess 48 to assume the position illustrated in Figure 2. As clearly seen from this figure, the free end of hub 54 abuts the wall of camera 20 and retains shutter plate 46 slightly spaced from the end of recess 48.

Since camera 20, when shutter plate 46 is in this position, is intended to photograph the moving contestants onto the continuously moving film 23, shutter plate 46 is provided with an exposure slit 57 of a width substantially exceeding the width of exposure slit 38 so as not to interfere with the exposed field of view established by slit 38. To assure optical cooperation between lens 43 and slits 38 and 57, frame 47 in alignment with the optical axis is provided with an opening 58 of a dimension suitable for permitting free passage of light through lens 43 and slits 38 and 57.

To one side of slit 57, shutter plate 46 is provided with a second exposure slit 59 of a width corresponding to the width of slit 38. The spacing between slits 57 and 59 is such that slit 38 may be properly covered when shutter plate 46 assumes the position illustrated in Figure 4, which is the shutter position just after a snapshot of the actual finish line has been made.

While slit 38 might be provided in any suitable manner, for ease of manufacture slit 38 is formed in a backing plate 61 (Figures 1 and 2) removably secured to frame 47 by screws 62 threaded into suitably tapped openings 63 formed in the marginal portions forming the boundaries of recess 48. As clearly seen in Figures 1 and 2 the flanges 39 for guiding the film 23 are also formed on this backing plate.

Figure 4:
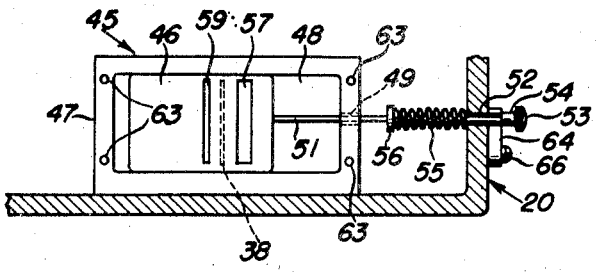
Figure 5:
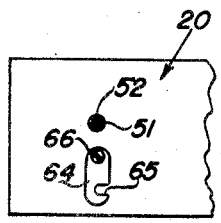
Figure 5 is an end view of the focal plane shutter when viewed from the right of Figures 2 through 4 and illustrating the pivoted stop provided for limiting the shutter movement during the making of still pictures.

In order to provide a simple means for stopping shutter 46 in the position of Figure 4, a stop plate 64 having an open ended slot 65 (Figure 5) is pivoted on the camera wall as indicated at 66. Stop plate 64 normally assumes the position shown in Figure 5 and is adapted to be swung to the position shown in Figures 3 and 4 with slot 65 receiving rod 51 when it is desired to make a snapshot of the actual finish line.

While drums 44 may be constructed in any suitable manner, the present invention contemplates a plastic or light weight metal cylinder 67 having its peripheral wall at one end extending axially beyond the end wall 68 and provided with four apertures 69 (Figures 1, 8 and 9) adapted to display indicia bearing rollers 71. To assure a proper driving connection, drum 44 is provided with a central disposed metallic hub 72 extending from end to end and adapted to be drivingly connected to a shaft 73 (Figure 1) driven at a constant speed from an independent constant speed electric motor 74, to assure one revolution per second of drum 44 and an image speed approximately equal to the film speed.

End wall 68 along radii bisecting openings 69 is provided with journal openings (not shown) for snugly receiving one end 75 of the shafts carrying rollers 71 and the opposite ends 76 of said shafts are journalled in similar aligned openings (not shown) formed in end cover plate 77. As clearly shown in Figures 8 and 10, ends 76 are provided with kerfs 78 to receive a screw driver for turning rollers 71 in order that the desired indicia will be displayed through openings 69. While this indicia may take any desired form, in the illustrated embodiment the indicia consist of the numerals 1 to 9 formed in any suitable manner on the periphery of the rollers. End plate 77 is removably secured to cylinder 67 by means of screws 79 threaded into tapped apertures 81 in end wall 68.

In addition to the numerals on rollers 71 provided to indicate the number of the race, drum 44 also bears indicia 83, 84, 85 and 86 adapted to respectively display the name of the course and the calendar date, the word "Race" in the space between rollers 71, main time interval markings and axially extending, equally spaced lines, the opposite ends of alternate lines being suitably identified by numerals 87 or the like.

While this indicia may be applied in any suitable manner, it has been found most desirable to print this indicia on strips of paper or the like which are then cut and cemented to the drum in any well known manner. Thus indicia 83 is printed on a strip of paper and a length 88 (Figure 12) sufficient to go around the periphery of end cover plate 77 is cut off and cemented in place (Figure 1).

Next a suitable length 89 (Figure 13) of the strip bearing the word "Race" and having rectangular openings 91 equally spaced therealong so as to coincide with openings 69 when cemented to drum 44 is cut and cemented in place directly beneath strip 88 (Figure 1).

Next a suitable length 92 (Figure 14) of the strip bearing the time interval markings 85 is cut and cemented to the drum directly beneath strip 89. It is to be noted that the usual diagonal line of the fraction ⅕ is equally spaced along strip 92 and that the spacing thereof on the exposed film (Figures 6 and 7) is also equal. This is carefully worked out so that the fraction line will divide the periphery of drum 44 into five parts and, due to the fact that the drum 44 makes one complete revolution per second, the fraction lines will indicate fifths of a second on the exposed film. This indication will be extremely accurate due to the close proximity of the drum to the film 23 and lens 41 during operation of the camera. Accordingly, an extremely accurate determination of the time interval between the successive contestants can be rapidly determined from a mere inspection of the exposed film. Furthermore, this time indication will not be noticeably affected by normal variations in the speed of the film required to synchronize the linear speed of the film to that of the images of the contestants, since repeated tests clearly show that the necessary variations in film speed normally encountered in practice are quite small and have a negligible effect where the time element is in close proximity to its objective.

Next a suitable length 93 (Figure 11) of the strip bearing the axially extending lines is cut and cemented to the drum directly beneath strip 92. While it would be desirable to align these axial lines with the adjacent ends of the fraction lines to secure an accurate division of the fifth of a second intervals, this is not absolutely necessary since the spacing of the axial lines is so small and the number of lines to each indicated time interval so large that an error in reading of one or two of the axial lines would be negligible. It, however, is desirable, and this invention contemplates that the length of strip 93 will be such that the number of the axial lines at the meeting edges will be in proper sequence.

Drum 44, of course, is constructed so that its axis lies, for all practical purposes, on the optical center of lenses 41 and 42 and the axial lines on its periphery will lie parallel to the axis and truly perpendicular to the edges of the film. This is done to assure that the images of the axial lines will be truly transversely disposed to the edges of film 23 so that when the actual finish line on the course is aligned with a vertical plane substantially passing through the optical axis of lens 43 the images of the axial lines and the actual finish line will be parallel as well as true transverse lines across film 23.

While the present invention discloses photographic means for applying the identifying data and reference lines to the edges of film 23, it will be appreciated that this material might equally well be applied by a conventional contact printer operatively associated with the moving film and driven at the desired timed speed or in any other suitable manner.

To make accurate and indisputable photographic records of the finish of a race, the camera of the present invention is mounted above and about 150 feet to one side of the race course (preferably the inside) with the actual finish line of the race course in substantial alignment with the axis of objective 43. The finish line of the course preferably is surveyed to assure its accuracy from end to end. With the camera rigidly fastened in its set position and shutter 46 preferably in the position of Figure 2, drum 44 and film 23 are set in motion to record the informational data and reference lines from drum 44 on the edges of the film. After the edges of a suitable length of film have been exposed shutter 46 is manually moved to the position of Figure 3 with stop plate 64 in stop position, the film and drum are stopped and shutter 46 is released. Spring 55 projects the shutter slit 59 across exposure slit 38 and movement of the shutter under influence of spring 55 is arrested by engagement of hub 54 with stop plate 64. The film is again set in motion and the exposed length is cut off and developed so that a check can be made to make sure that the reference lines and image of the actual finish line are parallel.

In event the desired parallelism does not exist, the necessary checks of the film feed and camera set up are made and such adjustments as may be necessary are made until the desired parallelism is obtained. When the parallelism of the reference lines and finish line prove, the camera is ready for operation.

Assuming a race is about to start and the camera has been proven as set forth above, a still snap shot of the actual finish line is made on the film in the manner previously mentioned to form the image 95 of the finish line. The shutter 46 is then moved to the position of Figure 2 and film 23 and drum 44 are then again set in motion a sufficient length of time before the contestants reach the actual finish line to assure the rotation of drum 44 at the predetermined timed speed and the film at the approximate speed of the images of the contestant as the contestants cross the finish line. With the camera operating in this way, the images 71a, 83a, 85a, 86a and 91a of reference lines 86 and informational data, including the identifying data 83 and 84 and the time interval markings 85, will be successively formed on the edges of film 23 and the images 96, 97 and 98 of the contestants crossing the finish line will be formed along the center of film 23 between reference lines 86 and under the time interval markings 85.

Since film 23 is continuously moving past slit 38 and objective 43 and as the effective field of view is delimited by the edges of slit 38 to a narrow area, for all practical purposes the area of the actual finish line, images 96, 97 and 98 will be successively formed in the order in which the successive portions of the contestants cross the finish line of the race course. Also since lines 85 and 86 are formed on the continuously rotating drum 44 which is constantly driven at a speed of one revolution per second and film 23 moves at substantially the same speed as the images of these lines, the images 85a and 86a will be formed on the edges of film 23 at equally spaced intervals to furnish an accurate time record showing the interval of time between the successively finishing contestants. As this time record is formed from mechanism housed in the camera and through objectives located closely to the accurately formed record drum 44, the time record on the film will be completely accurate and will not be subject to distortion by distance, heat waves and the like that would occur if the record drum were a substantial distance from the objectives.

After the last contestant has passed the finish line, a snapshot of the finish line is again made to record the image 99 at the opposite end of the photographic record. Thus the parallelism of reference line images 85a and 86a and the actual finish line can, after development of the film, be checked both before and after the production of the photographic record of the finish to prove the accuracy of the photographed reference lines and the setting of the camera.

Figures 6, 7:
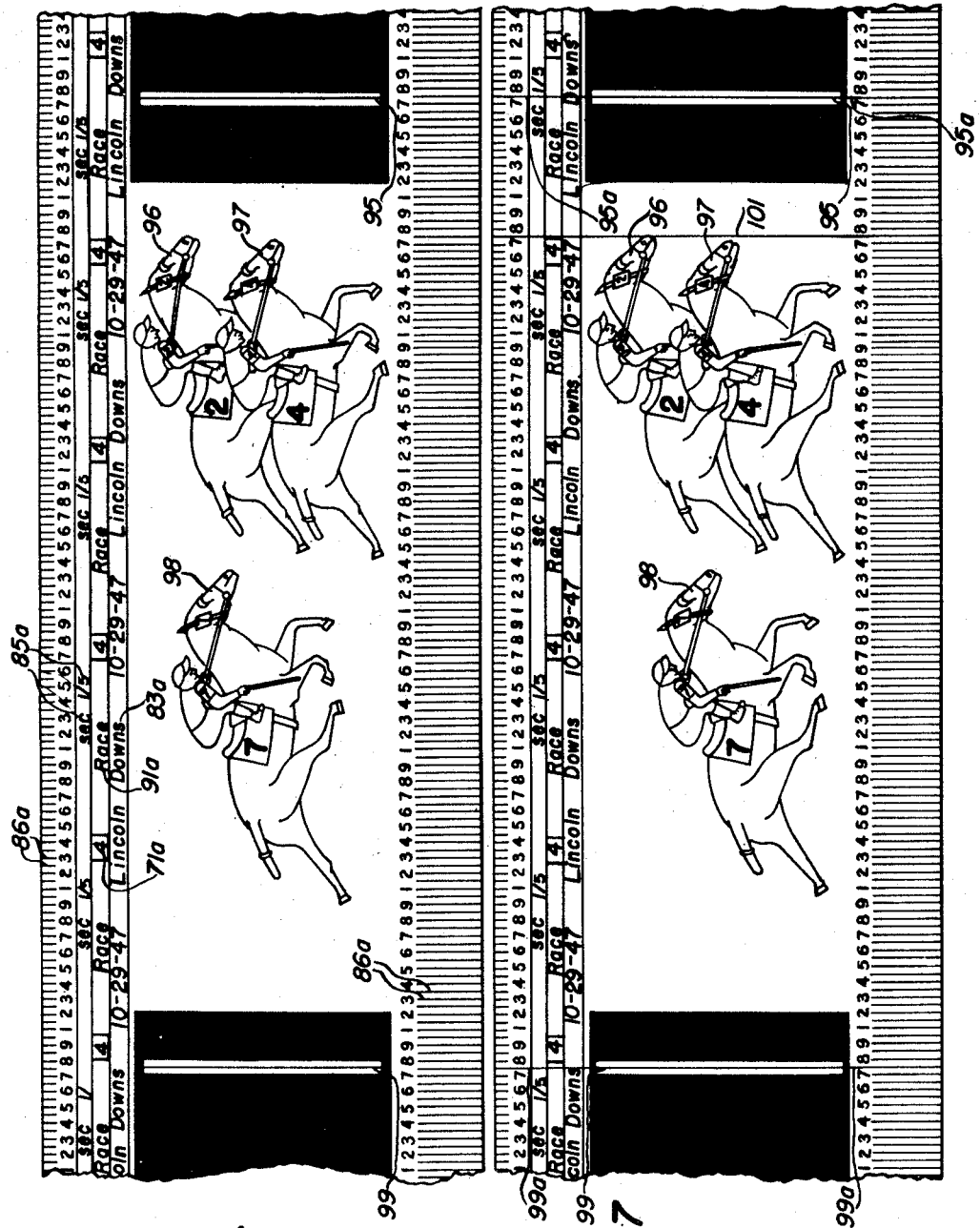
Figure 6 is a view of an exposed strip of film after it has been developed, but before application of the determinative superimposed finish line.
Figure 7 is a view of the final film with the determinative superimposed finish line applied.

The developed photographic film recording the finish of each contest will appear as illustrated in Figure 6 of the drawings, and is disclosed and claimed in the copending application of James J. Jones, Serial No. 110,393, filed August 15, 1949, and entitled Photofinish record along with the final printed record strip of Figure 7 of the drawings. To definitely establish the parallelism of images 95 and 99 and reference lines 86a, a straight edge is placed with its edge lying along the images 95 and 99 and extensions 95a and 99a are drawn on the developed film across to the edges of the film. These extensions, due to the close proximity of the images 86a will fall along opposite aligned reference lines or sufficiently close thereto to positively prove the parallelism. Since every other image line 86a is numbered or otherwise identified and as these image lines on each edge of the film are in fact photographs of the opposite ends of the same straight reference line, a checker is assured of proper parallelism if extensions 95a and 99a coincide with similarly identified lines on the opposite edges.

Being assured of the accuracy of the set up of the camera and the parallelism of reference lines 86a to the actual finish lines because of the proving of the parallelism of the images of the actual finish line and reference lines 86a, a determinative finish line 101 is drawn on the developed film by lining a straight edge touching the most advanced portion of the leading contestant up with the images 86a of the same reference line at each edge of the film. Since the reference lines 86a are parallel to the images 95 and 99 of the actual finish line and as line 101 is a continuation of the images of the ends of the same reference line, it follows that line 101 is exactly parallel to the actual finish line of the race course and that the actual winner is shown by line 101.

In order to determine the time interval between the finish of the race by the successive contestants, the straight edge is successively placed upon opposite image lines 86a so as to just touch the most advanced portion of each successive contestant. By counting the number of lines 86a and 85a between the line 101 and the straight edge positioned as just pointed out, the actual finish time of each contestant after the winner can be determined within approximately one two-hundredths of a second using the recorded finishing time of the winner and adding the fractional seconds between the winner and each successive contestant.

Since the development of the photographic record and the construction of proof lines 95a and 99a and line 101 and the counting of the fractional seconds between successive contestants can be done in a matter of minutes, it will be appreciated that the present invention provides not only an accurate and permanent record of the finish of each contest but enables the accurate determination of the position and time of finish of each contestant within an extremely short time after the finish of each contest. Furthermore, since the informational data given by images 71a, 83a and 91a definitely identifies the race course, the date of the race and the number of the race, there can be no question as to the particular contest depicted by the record. Also since the member 71 is readily adapted for changing the number of the contest by use of a screw driver inserted in kerf 78, an accurate record of each contest can be obtained with a minimum of effort.

While proper positioning of the camera as to height above the race course will effectively eliminate the possibility of the image of one contestant obscuring the image of another contestant, difficulty of this nature may be effectively eliminated by placing a suitable plane mirror at the end of the finish line opposite that upon which the camera is set. Such a mirror must be set up with one edge aligned with the finish line, its mirror surface absolutely at right angles to the finish line and tilted backward so as to reflect the mirror images into the objective 43. If such a mirror is used a mirror image of each contestant, showing each contestant as viewed from the opposite side of the track, will be produced on the film and this mirror image may be utilized as a further check on the winner since a properly drawn line 101 should touch the corresponding points of both images of the contestants. In event it is found that the film is not wide enough to accommodate the direct images, mirror images and desired informational data and reference lines, a wider film and a camera adapted to handle such wider film may be produced without departing from the present invention.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A device for photographically recording the order in which a plurality of contestants cross the finish line of a race course comprising a camera having a film therein; means in said camera for selectively projecting an image of the finish line and the contestants as they cross the finish line onto the central area of said film; and means carried in fixed predetermined relation to said camera and arranged in predetermined relation to said first mentioned means for simultaneously imposing respectively aligned and identified reference markings at spaced intervals along the opposite longitudinal marginal edges of the film in parallel relation to the image of the finish line formed by said first mentioned means to provide aligned axially spaced pairs of respectively identified reference markings adapted for use in constructing a determinative finish line parallel to said image of said finish line and tangent to the leading portion of the images of the contestants photographed on the central area of the film.

2. The combination of claim 1 together with means for selectively photographing the actual finish line of the race course onto the center of the film in longitudinal spaced relation to the photograph of the contestants whereby the parallelism of the reference lines and finish line may be proven.

3. A camera for photographically recording the order in which a plurality of contestants cross the finish line of a race course comprising selectively operable means for continuously moving a film through a camera; an exposure slot adapted to cover a narrow field of view containing the finish line of the race course; lens means associated with said slot for forming an image of said field of view on the central area of the film; and means carried in fixed predetermined relation to said camera and arranged in predetermined relation to said lens means for simultaneously imposing respectively aligned and identified reference markings at spaced intervals along the opposite longitudinal marginal edges of the film in parallel relation to the image of the finish line formed by said lens means to provide aligned axially spaced pairs of respectively identified reference markings adapted for use in constructing a determinative finish line parallel to said image of said finish line and tangent to the leading portion of the images of the contestants photographed on the central area of the film.

4. The combination defined in claim 3 together with shutter means, associated with said exposure slot but normally inoperative, for selective operation during non-movement of the film to photograph the finish line of said race course through said slot onto the central area of the film to permanently record the image of the finish line for checking the parallelism of the said aligned reference lines.

5. A camera for photographically recording the order in which a plurality of contestants cross the actual finish line of a race course comprising selectively operable means for moving a film through said camera; a main objective lens means for photographing the contestants as they cross the finish line onto the central area of said film; a pair of axially aligned, axially spaced exposure slits disposed along the path of movement of said film in axial parallelism to the vertical axis through said lens means, one opposite each longitudinal marginal edge of said film; a revolving drum carried in fixed predetermined relation to said camera and disposed with its axis of rotation parallel to the axes of said pair of slits and its peripheral ends respectively in the field of view through said slits, and having peripherally spaced, axially extending lines on its peripheral surface; identifying indicia at the opposite ends of selected ones of said lines for individually identifying successive lines; and means optically associated with said pair of exposure slits for forming successive spaced images of the opposite ends of said lines and said identifying indicia along said opposite longitudinal marginal edges of the film in axial alignment to provide successive aligned axially spaced pairs of respectively identified reference lines adapted for use in constructing a determinative finish line for determining the order of finish of said contestants.

6. The combination defined in claim 5 wherein said last mentioned means comprises means for driving said drum at a timed speed approximating the speed of said film.

7. The combination defined in claim 5 together with shutter means connected to said main objective lens means and adapted to be selectively operated during non-movement of said film to record a snap shot image of said actual finish line onto said film between the inner terminal ends of said reference lines whereby the parallelism of said reference lines to said actual finish line may be proved.

8. The combination defined in claim 5 wherein said drum comprises, in addition to said axially extending lines and indicia, peripherally extending rows of informational data adjacent one end adapted, when photographed, to form on one edge of the film a continuous visual record identifying the racing establishment and the date and the number of the respective races.

9. In a camera for photographing onto a continuously moving film the order in which a plurality of contestants cross the actual finish line of a race course, lens means for selectively projecting an image of the finish line and the contestants as they cross the finish line onto a moving film; slit means limiting the area of the exposure of said lens means to a narrow transverse band containing the finish line; additional lens and slit means arranged in predetermined relation to said first mentioned lens and slit means for simultaneously photographing respectively aligned and identified reference markings at spaced intervals along longitudinal, transversely spaced areas of said film in parallel relation to the image of the finish line formed by said first mentioned lens and slit means to provide aligned axially spaced pairs of respectively identified reference markings adapted for use in constructing a determinative finish line parallel to said image of said finish line; selectively operable means for simultaneously moving said film past said respective slit means to expose successive areas of said film through said respective slit means; and shutter means optically cooperating with said first mentioned lens means and said first mentioned slit means and selectively operable during non-movement of said film to produce a snap shot of the actual finish line on said film, said shutter means comprising a movable shutter plate containing a relatively wide exposure slit normally cooperating with said first mentioned slit means during periods of movement of said film and a spaced narrow exposure slit adapted, upon selective operation of said shutter means, to move rapidly past said first mentioned slit means and produce said snap shot.

10. The method of making a photographic record of the order in which a plurality of contestants cross the finish line of a race course and proving the determination of the winning contestant comprising the steps of applying respectively aligned and identified reference marks at longitudinally spaced intervals along the opposite marginal edges of a film strip; forming a photographic image of the actual finish line of the race course on the central portion of said film strip between and parallel to said edge markings whereby the parallelism of said mark to the actual finish line may be proven; forming photographic images of each contestant on the central portion of said film strip in successive order as they pass the actual finish line; and constructing a determinative finish line on said film strip tangent to the leading portion of the images of the leading contestant utilizing aligned axially spaced pairs of said respectively identified reference marks to assure accurate construction of said constructed finish line and its parallelism to said image of the actual finish line.

11. The method defined in claim 10 together with the further step of forming a second photographic image of the actual finish line of the race course on the central portion of said film strip anterior to the photographic images of the contestants to furnish proof of the parallelism of said markings to the actual finish line after recording of the finish of the race.

12. The method of making a photographic record of the order in which a plurality of contestants cross the finish line of a race course and proving the determination of the winning contestant comprising the steps of simultaneously forming photographic images of the opposite ends only of a series of successively displayed, respectively identified lines, moving at a predetermined timed speed, at spaced intervals along the opposite marginal edges of a moving strip of film substantially at right angles to the edges of said film to form aligned spaced pairs of respectively identified images; forming a photographic image of the actual finish line of the race course on the central portion of said film between and parallel to said images formed along the marginal edges of said film whereby the parallelism of said marginal images to the actual finish line may be proven; forming photographic images of each contestant on the central portion of said film in successive order as they pass the actual finish line; and constructing a determinative finish line on said film tangent to the leading portion of the images of the leading contestant utilizing aligned axially spaced pairs of said respectively identified images to assure accurate construction of said constructed finish line and its parallelism to said image of the actual finish line.

13. The method defined in claim 12 wherein the successively displayed lines are moved at a predetermined speed in close proximity to said film so said photographic images thereof furnish an accurate time interval record along the edges of the film together with the further step of determining the respective time interval elapsing between each contestant as it passes the finish line by laying a straight edge across the film strip in contact with the aligned, axially spaced pairs of said respectively identified images closest to the determinative portion of each contestant and counting the number of said pairs of images between the edge of said straight edge and the constructed finish line.

14. A drum for displaying informational data to be photographically reproduced on a film record in sequence comprising a body of elongated cylindrical form adapted for rotation around its longitudinal axis and having angularly spaced recesses at one end intersecting the peripheral wall of said body to provide circumferentially spaced openings in said peripheral wall; covering means having parallel, equally spaced lines extending from a point adjacent one end of said body to a point adjacent the opposite end thereof and defining marginal areas containing identifying indicia adjacent the opposite ends of certain of said lines for individually identifying each successive line from its neighboring lines, said means completely surrounding and being secured to a portion of the periphery of said body in axially spaced relation with respect to said circumferentially spaced openings whereby upon rotation of said drum at a predetermined speed said lines, when photographed, will produce combined reference and timing markings on said film record; and individually removable information bearing strips secured to and completely surrounding the peripheral wall of said body in the peripheral area of the wall containing said circumferentially spaced openings and the peripheral areas at opposite sides of said peripheral area to provide identifying data which, when photographically reproduced on said film record, will afford individual identification for said film record.

15. The combination defined in claim 14 wherein said one strip secured to the peripheral area of the wall containing said circumferentially spaced openings is apertured to expose said openings and said recesses are provided with selectively rotatable roller elements journalled for rotation with respect to said body and bearing indicia to be selectively displayed through said openings to complete the identifying data furnished by said one strip.

16. The combination defined in claim 15 wherein each of said roller elements is provided with a journal shaft one end of which is accessible from an end of said drum and is provided with a tool receiving recess adapting each of said roller elements for selective individual rotation to change the displayed indicia.

JAMES J. JONES.

REFERENCES CITED

The following references are of record in the file of this patent:

UNITED STATES PATENTS

| Number | Name | Date |
| --- | --- | --- |
| 621,314 | Barber | Mar. 21, 1899 |
| 1,849,939 | Lipshitz | Mar. 15, 1932 |
| 2,320,350 | DelRiccio | June 1, 1943 |
| 2,430,975 | Crowley | Nov. 18, 1947 |